Oct. 2, 1951  A. P. HATCHER  2,569,854
DRILL TOOL
Filed Aug. 2, 1949
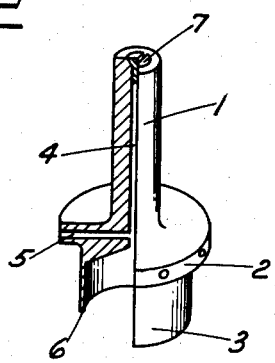
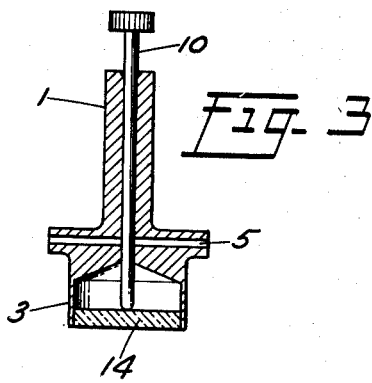
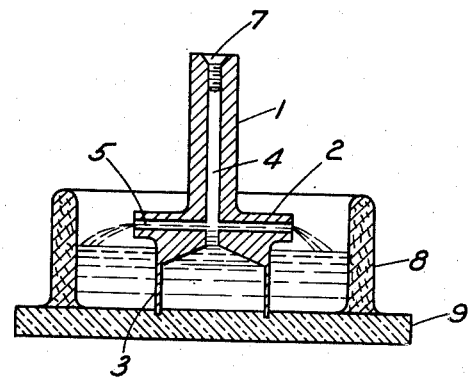
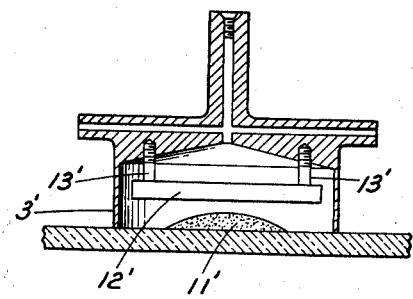
Inventor
Alexander P. Hatcher
By Roland A. Anderson
Attorney Patented Oct. 2, 1951

2,569,854

UNITED STATES PATENT OFFICE 2,569,854

DRILL TOOL

Alexander P. Hatcher, Knoxville, Tenn., assignor to the United States of America as represented by the United States Atomic Energy Commission Application August 2, 1949, Serial No. 108,147

3 Claims. (Cl. 125—20)

My invention relates to drills and cutters and more particularly to a tool for forming holes in glass, quartz, Pyrex, tungsten carbide, and the like.

In the art of glass cutting, it has long been standard procedure for the operator or mechanic to employ a rotary cup shape drill, or a piece of tubing, of a specific diameter, aided by cutting compound or cutting abrasive, when cutting a hole in glass or the like. This operation included the building of a caisson or a substantially circular dam of putty materially larger in area than the opening to be cut, and to position it about the place where the cutting operation was to proceed. This caisson was filled with a mixture of water and abrasive compound. The cutting edge of the drill, which was generally of soft metal, was then submerged into this mixture and rotated to bring the abrasive into engagement with and cut the glass by such utilization of the abrasive material. In the past, this particular operation was sometimes very laborious, for the drill stirred up the water and abrasive, and by centrifugal action, caused the heavier particles of abrasive material to move away from the drill, permitting it to come into contact with the work. This effectively ended the cutting operation. To overcome this defect, the operator would periodically raise the drill up out of the liquid to permit the return of the abrasive to the cutting position, and then again lower the cutting edge of the drill into the liquid and abrasive to commence the cutting action again. This made the cutting operation a very tedious, slow and tiresome job.

In another form, a large casing or housing, was provided to receive and retain the liquid mixture of abrasive. A revolving cutting tool was disposed within the housing after it had been secured to the work which was to be cut; but this arrangement was open to the same objections noted above, and in addition permitted loss of abrasive and its liquid carrier. For a more detailed discussion of the problem, see Aldeen, 1,927,865.

Applicant with a knowledge of all these defects in and objections to the arrangements of the prior art has for the object of his invention the provision of a cutter tool for glass and the like which will operate to interpose abrasive between the cutting edge of the tool and the work during the cutting operation.

Applicant has as another object of his invention the provision of a rotary tool for cutting glass and the like which insures continuous operation by eliminating the necessity for periodically or intermittently raising the tool out of the cutting medium of liquid or abrasive during the cutting operation.

Applicant has as a further object of his invention the provision of a cutting tool for glass and the like for maintaining abrasive between the cutting tool and the work during the cutting operation.

Applicant has as a further object of his invention the provision of a cutting tool for glass and the like which produces a pumping action for pulling the liquid and abrasive carried thereby between the cutting edge and the work during the cutting operation.

Applicant has as a still further object of his invention the provision of a cutting tool of material softer than the glass or other work to be cut for producing a centrifugal pumping action to draw the liquid and cutting abrasive under the cutting edge of the tool between it and the work during the cutting operation.

Applicant has as a still further object of his invention the provision of a rotary tool for cutting glass and the like which acts to provide a pumping action to continuously draw liquid carrying abrasive into the tool between its cutting edge and the work and against the repelling centrifugal action of the revolving cutting edge of the tool, to supply a cutting medium therefor.

Other objects and advantages of my invention will appear from the following specification and accompanying drawings and the novel features thereof will be particularly pointed out in the annexed claims.

In the drawings, Fig. 1 is a longitudinal sectional elevation of my improved cutting tool disposed in a cutting medium. Fig. 2 is a perspective of the same tool, partly in section. Fig. 3 is a sectional elevation of the same tool after the completion of the cutting action, and showing the removal of a glass slug therefrom. Fig. 4 is a sectional elevation of a modified form of my improved cutting tool.

Herein disclosed is a new and improved glass or other cutting drill which, by a centrifugal pumping action produced therein, continuously pulls the liquid and abrasive under the cutting edge of the drill, thereby eliminating the necessity for intermittently moving the drill up out of the cutting medium. This particular drill keeps the grit or abrasive from "settling out" in the water. A drill of this type can, in some instances, reduce the time required for cutting a hole in glass to approximately one-tenth of the time previously employed when using the methods and apparatus of the prior art, referred to above.

Referring to the drawings in detail, and particularly to Fig. 1, my improved drill comprises a hollow tubular shank 1 of brass, aluminum, or other suitable soft metal or material, for fitting into a standard or commercial drill chuck (not shown). This shank is provided with an enlarged angular flanged portion 2 and with a cupped shaped cutting portion 3 extending outwardly therefrom. The bore 4 passes axially through the shank 1, as shown in the drawings. It is closed adjacent the upper end by a screw 7 which seats into a screw threaded socket formed therein, and effectively creates a barrier to the passage of gases or liquids. About the rim of the flange 2 there may be provided a plurality of small bores 5, each communicating with the central bore 4, and with the interior of the cup portion 3. The cutting edge 6 and the walls of the cup portion of the drill are of such thickness as to insure rigidity during the cutting operation, and preferably lie within the range of 30 to 60 thousandths of an inch, but may run up to $\frac{1}{32}$ of an inch for large size drills.

In the operation of this particular device, the upper extremity of the bore 4 in shank 1 is closed or sealed to prevent the ingress or egress of air or liquid. This may be accomplished by insertion of the screw 7 which co-acts with threads in the walls of the upper extremity of the bore 4, as indicated above. The shank is then inserted into the usual power drill chuck (not shown) and rotated in the conventional manner, with the drill tool, including the flange 2, preferably submerged in the mixture of water and abrasive defined by the circular dam 8 of putty or other material positioned on the upper surface of the work 9 at the position to be cut. When the drill assumes its speed, the mixture of water and abrasive will be sucked up through the cup and out the bores 5 in the rim or periphery of the flange, to provide a centrifugal pumping action. This, in turn, draws the liquid and abrasive into the cup 3 between the cutting edge and the work, to replace the liquid and abrasive which are passing out through the bores 5 of the flange 2. Since this is a continuous operation during the period while the drill is in rotation, the operator need not stop the drill or remove it from the work surface during the cutting operation as the grit or abrasive is continuously maintained or supplied to the cutting edge of the drill, as indicated above.

At the end of the operation when the tool or drill has penetrated entirely through the work, it will be apparent that circular or disk shaped glass slugs, cut from the work, will remain in the cup 3. If the slug is loosely held, it may be removed by the fingers of the operator or with the ordinary shop tools. However, if it is tightly held, the tool must be taken from the drill chuck (not shown) and the screw 7 removed from the shank 1, after which a punch or tool 10, having a long slender shank, may be inserted down through bore 4 to engage the glass or other slug 14 and force it out through the open mouth portion of the cup 3 as generally indicated in Fig. 3.

While flange 2 of the tool has been shown with a plurality of spaced radial bores 5 extending from its outer surface to the longitudinal bore 4, it is apparent that the number of such radial bores may be limited to that necessary for best operating results. In the preferred form of the invention, the number of bores 5, 5 were limited to two and were positioned 180° from each other about the periphery of the flange 2.

The abrasive mentioned above may be conventional to the art and can include silicon carbide, boron carbide, or aluminum oxide, preferably of about 100 mesh in size. However, the choice of abrasive will largely depend upon the material of the work to be cut. It will be appreciated, of course, that for different sizes of drills or cups, different speeds of rotation should be used for optimum results. For example, a drill with a one inch cup should preferably be rotated at about 800 R. P. M., while a drill with a six inch diameter cup would preferably rotate at 200 R. P. M. Of course, one limiting feature on the speed of these drills is that if they run too fast they will spray water out of the dam and cause an excessive loss of abrasive.

In this arrangement, it will be found that in some cases the time necessary for cutting a hole in glass is less than one-tenth of the time required by the previous conventional method. The life of the drill will be greatly increased, and this results in substantial savings in time and labor in the cutting of holes in glass or other materials.

A modification of Fig. 4 is particularly well adapted for larger drills or tools where the abrasive tends to accumulate in a pile 11' in the center of the cup 3', and to interfere with the cutting operation. This is overcome by inserting an elongated plate 12' vertically of the cup portion 3', and anchoring it in position by studs 13', 13' extending through spaced openings in the plate 12' to seat in sockets in the innerface of the cup, and co-act with screw threads therein. The operation of the modification of Fig. 4 is similar to that of Fig. 1, except that the plate 12' engages and disperses the pile 11' as it builds up, and prevents undue accumulations which might retard the cutting operation.

Having thus described my invention, I claim:

1. A cutting tool of the character described comprising a rotary shank having a reduced elongated body terminating in an enlarged portion, a cup portion projecting forwardly from the enlarged portion and having an edge for engagement with a liquid suspended cutting abrasive on the surface of hard material to be cut, and a plurality of spaced radial openings passing through the enlarged portion for communication with the cup to provide liquid abrasive pumping action during rotation of the shank and draw abrasive between said edge and the surface to maintain cutting action.

2. A cutting tool of the character described comprising a rotary shank having a reduced elongated body terminating at one end in an enlarged cylindrical portion, a cup portion projecting forwardly from the cylindrical portion and having an edge for engagement with a liquid carried cutting abrasive on the surface to be cut, and a plurality of spaced radial openings passing through the enlarged portion for communication with the cup to provide a pumping action during rotation of the shank and draw liquid abrasive between said edge and said surface to maintain cutting action.

3. A cutting tool of the character described comprising a shank for rotary movement, a cup shaped portion projecting forwardly from the shank and having an edge for engagement with a liquid suspended cutting abrasive on a surface to be cut, means for drawing the abrasive material into the cup between the edge and said surface to maintain cutting action, and means suspended in said cup to control accumulation of said abrasive.

ALEXANDER P. HATCHER.

REFERENCES CITED

The following references are of record in the file of this patent:

UNITED STATES PATENTS

| Number | Name | Date |
| --- | --- | --- |
| 2,184,919 | Miller | Dec. 26, 1939 |
| 2,389,188 | Esdale | Nov. 20, 1945 |

FOREIGN PATENTS

| Number | Country | Date |
| --- | --- | --- |
| 276,271 | Great Britain | Aug. 25, 1927 |